June 16, 1959   L. ALDERS ET AL   2,891,098
PURIFICATION OF HALOHYDRINS
Filed July 18, 1957
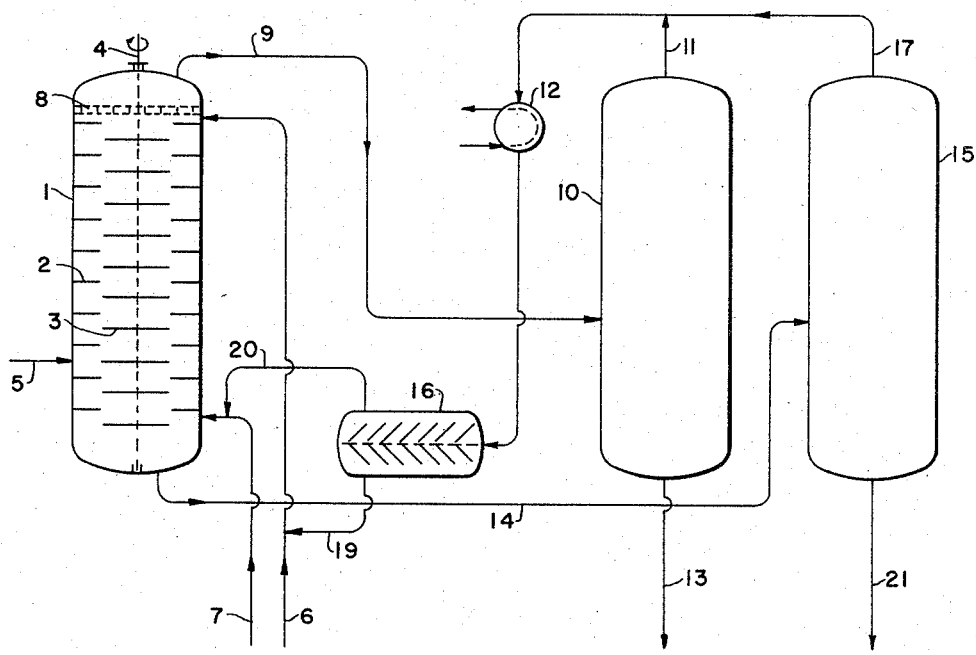
INVENTORS:
LUCAS ALDERS
NICOLAAS MAX
JACOBUS J. TJEPKEMA
BY: *Millard L. Caldwell*
THEIR ATTORNEY

United States Patent Office 2,891,098
Patented June 16, 1959

2,891,098

PURIFICATION OF HALOHYDRINS

Lucas Alders and Nicolaas Max, Amsterdam, and Jacobus J. Tjepkema, The Hague, Netherlands, assignors to Shell Development Company, New York, N.Y., a corporation of Delaware Application July 18, 1957, Serial No. 672,687

Claims priority, application Netherlands July 20, 1956

12 Claims. (Cl. 260—633)

This invention relates to the purification of halohydrins having at least 5 carbon atoms per molecule. It deals with a new method whereby impurities can be removed efficiently and cheaply from these compounds.

Halohydrins are generally prepared by reacting the corresponding ethylenically unsaturated compounds, for instance, olefins, with a hypohalous acid, such as hypochlorous or hypobromous acid, which can be preformed or produced in situ by adding halogen to the aqueous reaction medium or in other ways. Whether made by such or other known methods, the halohydrin products obtained are contaminated with impurities. This is also often the case with halohydrins recovered after use as solvent medium or for other purposes in industry. The purification of such impure halohydrins can be carried out successfully by conventional methods such as distillation, treatment with adsorbent solids such as activated carbon, or the like, when the halodrydrins are of low molecular weight, i.e., contain not more than 4 carbon atoms per molecule. Such methods of purification are not satisfactory, however, in the case of halohydrins having 5 or more carbon atoms per molecule. In particular, by-products formed in the manufacture of these higher molecular weight halohydrins are especially difficult to separate from the halohydrins sufficiently to make these halohydrins satisfactory for their intended use. Not only are these impurities undesirable in themselves but also they tend to cause increased discoloration of the halohydrins during storage and processing apparently as a result of their further reaction with unconverted starting materials or other components of the mixture, so their removal from the halohydrins to the greatest extent practical is highly desirable.

An important object of the present invention is the provision of a method for purifying halohydrins having 5 or more carbon atoms per molecule. A special object is to provide a process for removing difficultly separable by-products formed in the preparation of higher molecular weight halohydrins so as to obtain colorless products of satisfactory purity. A further object is the provision of an effective extraction process whereby impurities soluble in paraffins can be removed from halohydrins of low solubility in water having 5 to 40 carbon atoms per molecule. Still other advantages of the invention will be apparent from the following description of the new purification method.

It has been found in accordance with the invention that halohydrins having at least 5 carbon atoms per molecule, can be purified of undesirable components by extraction simultaneously with two counter-current flowing, incompletely miscible solvents of a particular composition. One of these solvents, hereinafter referred to as the extraction liquid, consists of aqueous alkanol of not more than two carbon atoms per molecule. The other solvent, which will be referred to as the washing liquid, is alkane comprising a paraffin having 5 to 7 carbon atoms per molecule.

The alkane solvent or washing liquid can be a single paraffin hydrocarbon of 5 to 7 carbon atoms per molecule, such as n-pentane, iso- or normal-hexane or one of heptanes, or a mixture of two or more such paraffins. Thus, instead of the individual alkanes, one can use a mixture of alkanes having the same number of carbon atoms per molecule in the range of 5 through 7 or mixtures of one or more of the pentanes, hexanes and/or heptanes. The normal hexanes and heptanes and mixtures thereof have been found to be especially advantageous alkane solvents in the process of the invention.

As the aqueous alkanol solvent or extraction liquid, one can use aqueous methanol or aqueous ethanol or aqueous mixtures of these two alcohols.

These specific combinations of aqueous alkanol solvent and alkane solvent are unique in their effectiveness in the purification of halohydrins of low water solubility, i.e., those with 5 or more carbon atoms per molecule. By the use of these solvents in the process of the invention, not only can better results be obtained than with other purification methods hitherto known, but also superior purification can be achieved compared with extraction with other solvents or other solvent combinations. The particular pairs of solvents used in the new process have distribution coefficients $k_c$ and $k_b$ for the halohydrin and its admixed impurities, respectively, between the polar and non-polar solvent, which are especially advantageous for the purification.

By distribution coefficient is meant the ratio of the concentrations of one component of the feed, e.g., the halohydrin, in the extraction and washing liquid in a single-stage extraction equilibrium. The most important condition to which the pair of solvents must comply relates to both the absolute values of the distribution coefficients and the factor $k_c/k_b$, which, as is known, is a measure of the selectivity of the pair of solvents. The greater the value of this factor varies from one, the more selective will be the pair of solvents with respect to the components or groups of components of the mixture to be separated.

For a chlorohydrin of 84% purity obtained by chlorohydrinating tetradecene-1 by reaction with chlorine in an aqueous medium containing an organic liquid which is miscible, both with water and the olefin, such for example, as acetone or the like, as disclosed and claimed in copending application of Wijga, Serial No. 541,020, filed October 17, 1955, now Patent No. 2,856,417 the following distribution coefficients were found when using methanol with different amounts of water as the aqueous alkanol and n-heptane as the alkane solvent.

| Water content in methanol (vol. percent) | 5% | 6% | 8% | 10% | 14% |
|---|---|---|---|---|---|
| $k_c$ | 0.72 | 0.55 | 0.33 | 0.22 | 0.10 |
| $k_b$ | 0.160 | 0.116 | 0.07 | 0.043 | 0.022 |
| $k_c/k_b$ | 4.5 | 4.75 | 4.7 | 5.1 | 4.5 |

These figures show that optimum selectivity occurs with the use of aqueous methanol and n-heptane when the water content of methanol is approximately 10%. In practice therefore, the water content will generally be adjusted to a value of between 7 and 12% by volume. With lower and higher water contents the selectivity decreases. With water contents of less than 5% the miscibility of the solvents rapidly increases, while moreover the extract and raffinate phases are more difficult to separate from each other. When having a water content above 15%, the absolute value of $k_c$ is too small to obtain a separation at an economically attractive ratio of extraction liquid to feed.

With other pairs of aqueous alkanol of not more than 2 carbon atoms and alkane of 5 to 7 carbon atoms per molecule, the water content of the alkanol should also be in the range of about 5% to about 15% by volume and the best results are obtained when the water content is between 7% and 12% by volume, most advantageously between about 9% and about 11% by volume. When employing, for example, aqueous methanol of 90% concentration with normal-hexane, a $k_c/k_b$ value of over 8 was found for the same $C_{14}$-chlorohydrin, while a $k_c/k_b$ value of 6 was obtained when 90% ethanol was used with n-heptane.

Normal or isopropanol, whether or not containing water, was unsatisfactory as the alkanol solvent because the selectivity was found to be too low for practical purposes. Higher alcohols or other polar solvents such as acetone and higher ketones, ethers such as diethyl ether and diisopropyl ether, are also unsuitable in the process of the invention due to intersolubility, and use of water therewith does not avoid this difficulty. The use of other non-polar hydrocarbons instead of the $C_5-C_7$ alkanes in the process of the invention is also unsatisfactory. Thus, phase separation difficulties and too great intersolubility are encountered with the lower alkanes such as butane while higher boiling paraffins such as octane, are unsuitable due to difficulty in separation after the extraction. Aromatic hydrocarbons, for instance benzene, also have too great an intersolubility to be operative in the process.

The extraction can be carried out in various ways using either continuous or discontinuous methods of operation. Conventional extraction equipment can be employed satisfactorily. For instance, a system of mixers and separators, or an extraction column, for example, a column filled with Raschig rings or other suitable packing, or provided with perforated plates or the like, is suitable. The rotary disc contactor, hereinafter referred to as RDC, is an especially advantageous type of apparatus for carrying out the process of the invention. This apparatus, one modification of which is described and claimed in U. S. Patent 2,601,674, comprises a cylindrical vessel provided with stator rings in which is arranged a rotatable shaft on which rotor discs are fitted, the inner diameter of the rings being greater than the diameter of the discs. An extraction column, in particular an RDC, is preferably used.

The attached drawing is a schematic representation of one suitable arrangement of apparatus, not drawn to scale, for carrying out the new process with an RDC as the extraction unit. For purposes of simplification, auxiliary equipment such as pumps, condensers, reboilers, etc. as well as valves and the like, have been omitted since their location will be obvious to those skilled in the art. In the drawing, an RDC, 1, is provided with stator rings 2 and rotor discs 3 mounted on a rotating shaft 4. To the RDC there is supplied the halohydrin to be purified ("feed") via a line 5, the aqueous alkanol comprising not more than 2 carbon atoms ("extraction liquid") via line 6, and the alkane comprising 5 to 7 carbon atoms ("washing liquid") via line 7.

As a result of the difference in specific gravity extraction and washing liquid flow counter-current to each other, the currents and dispersal created by the rotating rotor discs effecting an intimate contact between the two liquid phases. The halohydrin and the impurities are preferentially distributed in extract and raffinate phase, respectively.

The feed and discharge rates are preferably so adjusted that the phase rich in methanol is the continuous phase. There will be a separation into layers in the upper part of the RDC; if desired this may be promoted by means of a grid 8. The separated raffinate phase is passed via line 9 to distillation column 10, from which an alkane-rich distillate is obtained which is led via line 11 and cooler 12 to separator 16. The raffinate, which has a higher content of impurities than the feed, is withdrawn via line 13.

In the same way, the extract phase is led via line 14 to distillation column 15. The separated distillate rich in alkanol is passed via line 17 and cooler 12 to separator 16. The combined distillates are separated into layers in separator 16. The aqueous alkanol layer is recycled to the RDC via line 19 and the alkane layer via line 20. These recycled extraction and washing liquids are mutually saturated with each other.

The extract is withdrawn by line 21 and consists of purified halohydrin. By controlling extraction conditions, the content of impurities in the halohydrin can be reduced to any desired value.

It is desirable that the two solvents be saturated with each other before they are introduced into the extraction column and this is conveniently accomplished by contact in a unit such as separator 16 of the drawing but other methods of achieving the same end can, of course be employed.

The process according to the invention is further illustrated with reference to the following non-limiting examples:

Example I

Into an RDC having 6 theoretical extraction stages and 2 theoretical washing stages above the upper part and lower part of the feed inlet, respectively, there were introduced per minute at a temperature of 25° C., 396 parts by weight of an aqueous solution which contained 90% by weight of methanol and was saturated with n-heptane at 25° C. into the first stage, viz. at the upper part. At the lower part of the RDC 75.6 parts by weight of n-heptane (saturated with aqueous methanol) were introduced per minute into the 7th stage, and 44.4 parts by weight of an 84.0% by weight pure hydrochlorination product of $C_{14}$-α-alkenes into the 6th stage.

Distillation of the extract phase which was obtained from the RDC in a quantity of 430 parts by weight per minute, yielded 29.6 parts by weight per minute of a 98% pure chlorohydrin. The raffinate phase (86 parts by weight per minute) yielded on distillation 15.7 parts by weight of a 54% by weight pure chlorohydrin per minute. 77.3% by weight was extracted of the quantity of chlorohydrins present in the feed.

Example II

A series of tests were carried out under the same conditions as in Example I, except that the feed rate of one of the solvents was varied. The results are shown in the following table:

| Feed rate, parts by wt. per min. | | Percent by weight of chlorohydrin in extract (purity) | Percent by weight of chlorohydrin extracted |
|---|---|---|---|
| 90% by wt. of methanol | n-heptane | | |
| 396 | 97.0 | 98.5 | 61.8 |
| 396 | 65.3 | 97.7 | 88.0 |
| 396 | 57.2 | 97.1 | 94.5 |
| 396 | 40.8 | 94.8 | 98.8 |

The desired degree of purity, at a given feed rate, can thus be obtained by controlling the rates at which the solvents are supplied.

Example III

The process of Example I was repeated, except that a 78.2% by weight pure $C_8$-chlorohydrin was used as the feed instead of the $C_{14}$-chlorohydrin.

Feed rate in parts by weight per minute of:

90% by weight of methanol _____ 212.3
n-Heptane _____ 57.7
$C_8$-chlorohydrin (prepared by hydrochlorination of a $C_8$-α-olefin) _____ 42.1
Percent by weight of chlorohydrin in extract_____ 97.7
Percent by weight of chlorohydrin extracted_____ 87.1

Example IV

The process of Example I was again repeated, except that n-hexane was used instead of heptane with the aqueous methanol of 90% by volume concentration.

Feed rate in parts by weight per minute of:

| | |
|---|---:|
| Methanol | 396 |
| Hexane | 88.6 |
| $C_{14}$-chlorohydrin | 44.4 |
| Percent by weight of chlorohydrin in extract | 99.4 |
| Percent by weight of chlorohydrin extracted | 88.7 |

Example V

The process of Example I was repeated except that 90% by volume ethanol was used instead of 90% by weight methanol. The following observations were made.

Feed rate in parts by weight per minute of:

| | |
|---|---:|
| 90% by volume ethanol | 112.0 |
| n-Heptane | 82.5 |
| $C_{14}$-chlorohydrin | 44.4 |
| Percent by weight of chlorohydrin in extract | 98.9 |
| Percent by weight of chlorohydrin extracted | 91.5 |

The halohydrins used in the foregoing examples were prepared by the method of the copending application of Wijga previously referred to, but it will be understood that these examples are merely illustrative and that the present invention is applicable to the purification in the same way of other impure halohydrins having at least 5 carbon atoms per molecule or mixtures of such halohydrins regardless of their source. Specific halohydrins other than those of the examples, which can be successfully purified by the new method include 1-chloropentanol-2; 2,5,5-trimethyl-3-chloropentanol-2; 3-chloromethylheptanol-3; 1-boromdecanol-2; 9-chlorooctadecanol-10 and 12-bromotetracosanol-11. Monohalo-aliphatic halohydrins having 8 to 24 carbon atoms per molecule are particularly preferred materials for purification by the new method, but other mono- and polyhalohydrins of 5 or more carbon atoms can also be similarly purified, especially those containing only carbon, hydrogen, halogen and hydroxyl oxygen in the molecule.

The extraction can be carried out at any temperature at which the mixture is in the liquid phase, but temperatures of the order of about 0° to about 50° C. are preferred and in this range the process is advantageously conducted under normal atmospheric pressure. As previously indicated, the proportions of the two solvents which are essential features of the new process can be varied. As a general rule, the weight ratio of alkane of 5 to 7 carbon atoms per molecule to aqueous alkanol of not more than 2 carbon atoms will be of the order of about 1:½ to about 1:8. It will thus be seen that the invention is capable of considerable modification and is not restricted to the details given by way of illustration nor by any theory advanced in explanation of the improved results which are obtained.

We claim as our invention:

1. A process for purifying halohydrins which comprises extracting an impure halohydrin having at least 5 carbon atoms per molecule by simultaneous contact with two incompletely miscible solvents one of which consists essentially of aqueous alkanol having not more than 2 carbon atoms per molecule containing about 5 to about 15% by volume of water and the other being alkane having 5 to 7 carbon atoms per molecule.

2. A process in accordance with claim 1 wherein the two said solvents are passed in counter-current flow to each other during the extraction.

3. A process for purifying a halohydrin which comprises extracting an impure halohydrin having 5 to 40 carbon atoms per molecule by simultaneous contact with counter-current flowing streams of (1) aqueous alkanol having not more than 2 carbon atoms per molecule containing about 5 to about 15% by volume of water and (2) alkane having 5 to 7 carbon atoms per molecule.

4. A process in accordance with claim 3 wherein the halohydrin is a chlorohydrin having 8 to 24 carbon atoms per molecule.

5. A process for purifying a chlorohydrin which comprises extracting an impure chlorohydrin having at least 5 carbon atoms per molecule by simultaneous contact with 2 counter-current flowing solvents one of which is an alkanol having not more than 2 carbon atoms per molecule containing about 7% to about 12% by volume of water and the other being an alkane having 5 to 7 carbon atoms per molecule.

6. A process in accordance with claim 5 wherein the alkanol solvent is methanol containing about 9 to about 11% water by volume.

7. A process in accordance with claim 5 wherein the alkanol solvent is ethanol containing about 9 to about 11% water by volume.

8. A process in accordance with claim 5 wherein the alkane is substantially normal-hexane.

9. A process in accordance with claim 5 wherein the alkane is substantially normal-heptane.

10. A process which comprises extracting a chlorohydrin having at least 5 carbon atoms per molecule simultaneously with two counter-flowing solvents one of which is aqueous alkanol having not more than two carbon atoms per molecule containing 7% to 12% by volume of water and the other of which is alkane having 5 to 7 carbon atoms per molecule, introducing said chlorohydrin at an intermediate point in the counter-flowing streams, and separately withdrawing an aqueous alcohol solution of said chlorohydrin and an alkane solution of impurities present in the chlorohydrin feed.

11. A process in accordance with claim 10 wherein the extraction is carried out at between about 0° C. and about 50° C.

12. A process in accordance with claim 11 wherein the solvents are mutually saturated with each other prior to their introduction to the extraction zone.

References Cited in the file of this patent

UNITED STATES PATENTS

| 1,496,675 | Irvine et al. | June 3, 1924 |
| 2,164,240 | Guinot | June 27, 1939 |

FOREIGN PATENTS

| 203,298 | Australia | Apr. 26, 1956 |

OTHER REFERENCES

Scheibel: "Technique of Organic Chemistry," vol. III (2nd. Edition), Interscience, N.Y., 1956; pgs. 360, 361.